(12) United States Patent
Menon

(10) Patent No.: US 9,292,457 B2
(45) Date of Patent: Mar. 22, 2016

(54) NETWORKING CLOUD AND METHOD OF USING THE SAME

(71) Applicant: Nimbuz, Inc., Saratoga, CA (US)

(72) Inventor: Raghavan Menon, Saratoga, CA (US)

(73) Assignee: NIMBUZ, INC., San Jose, CA (US)

( * ) Notice: Subject to any disclaimer, the term of this patent is extended or adjusted under 35 U.S.C. 154(b) by 0 days.

(21) Appl. No.: 13/844,103

(22) Filed: Mar. 15, 2013

(65) Prior Publication Data

US 2014/0164651 A1 Jun. 12, 2014

Related U.S. Application Data

(60) Provisional application No. 61/734,521, filed on Dec. 7, 2012.

(51) Int. Cl.
*G06F 13/28* (2006.01)
*H04W 4/00* (2009.01)

(52) U.S. Cl.
CPC ............... *G06F 13/28* (2013.01); *H04W 4/001* (2013.01)

(58) Field of Classification Search
CPC . H04W 4/001; H04L 12/587; H04L 67/1095; G06F 13/28
See application file for complete search history.

(56) References Cited

U.S. PATENT DOCUMENTS

| 7,277,946 B2 | 10/2007 | Humphrey et al. |
| 2002/0073204 A1 | 6/2002 | Dutta et al. |
| 2004/0128013 A1 | 7/2004 | Blawat et al. |
| 2008/0209039 A1 | 8/2008 | Tracey et al. |
| 2010/0211637 A1 | 8/2010 | Borzsei et al. |
| 2010/0274983 A1* | 10/2010 | Murphy et al. ............... 711/162 |
| 2010/0287219 A1 | 11/2010 | Caso et al. |
| 2011/0173337 A1* | 7/2011 | Walsh ................... H04W 4/023 709/229 |
| 2011/0225640 A1 | 9/2011 | Ganapathy et al. |
| 2012/0016838 A1* | 1/2012 | Arai et al. ...................... 707/610 |
| 2012/0042162 A1* | 2/2012 | Anglin et al. .................. 713/165 |
| 2012/0117534 A1* | 5/2012 | Hershenson et al. ......... 717/105 |
| 2012/0331394 A1* | 12/2012 | Trombley-Shapiro et al. ............................. 715/748 |
| 2013/0041931 A1 | 2/2013 | Brand |
| 2013/0110967 A1* | 5/2013 | Ueoka et al. .................. 709/214 |
| 2013/0123004 A1* | 5/2013 | Kruglick ......................... 463/29 |
| 2014/0074941 A1* | 3/2014 | He ................................ 709/206 |
| 2014/0157363 A1* | 6/2014 | Banerjee .......................... 726/2 |

OTHER PUBLICATIONS

Non-Final Office Action dated Oct. 3, 2014 for U.S. Appl. No. 13/610,889, 12 pages.
Non-Final Office Action dated Feb. 11, 2015 for U.S. Appl. No. 13/843,945, 6 pages.
Final Office Action dated Sep. 3, 2015 for U.S. Appl. No. 13/843,945, 12 pages.

* cited by examiner

*Primary Examiner* — Idriss N Alrobaye
*Assistant Examiner* — Ronald Modo
(74) *Attorney, Agent, or Firm* — Kilpatrick Townsend & Stockton LLP

(57) ABSTRACT

A cloud computing network device is disclosed. The device is configured to generate output data based on input data, wherein the output data is indicative of the input data, cause data indicative of the input data to be stored in a memory, and respond to instructions to access the input data by accessing the data stored in the memory.

20 Claims, 5 Drawing Sheets

NETWORKING CLOUD AND METHOD OF USING THE SAME

CROSS REFERENCE TO RELATED APPLICATIONS

This application claims the benefit of U.S. Provisional Application No. 61/734,521 filed Dec. 7, 2012, which is hereby incorporated by reference in its entirety and for all purposes.

FIELD OF THE INVENTION

The present invention relates, generally, to cloud computing networks and, more particularly, to systems and methods for storing data on a cloud network.

BACKGROUND OF THE INVENTION

A network of computing resources (e.g. hardware, software, memory, and peripherals), which are connected through a network, such as the Internet, may be referred to as a cloud computing network or a cloud. Devices (e.g. desktop computers, phones, laptop computers, and servers) which have access to a cloud, can utilize the computing resources of the cloud. In some implementations, given proper access authority, devices can access other devices connected to the cloud.

Devices connected to the cloud generally have memory resources for storing data locally. Accordingly, a first device connected to the cloud may access data stored in the second device connected to the cloud. In addition, the cloud itself generally has memory resources for storing data in the cloud. Accordingly, the first and second devices may access data stored in the memory resources of the cloud. Storing data locally is significantly cheaper than storing data in the cloud, however, access to locally stored data may be slow, or impossible, if for example, the device storing the data locally is off.

SUMMARY OF THE INVENTION

One implementation is a cloud storage controller. The controller includes an input port configured to receive input data from a first device, an output port configured to transmit signals indicative of output data to one or more second devices, an interface to a memory configured to store data, and a processor. The processor is configured to generate the output data based on the input data, where the output data is indicative of the input data, cause data indicative of the input data to be stored in the memory, and respond to instructions to access the input data by accessing the data stored in the memory.

Another implementation is a cloud storage controller. The controller includes an interface to a memory configured to store data corresponding to data stored on a first device, an input port configured to receive instructions to change the data of the first device, and an output port configured to generate signals indicative of output data, and to transmit the output data to one or more other devices. The controller also includes a processor configured to, in response to the instructions, cause the data stored in the memory to change according to the instructions, determine whether the first device is available, and after determining that the first type device is available, cause information indicative of the change to be transmitted to the first device.

Another implementation is a cloud storage controller. The controller includes an interface to a memory configured to store data corresponding to data stored on another device, and a processor. The processor is configured to access data characterizing the stored data corresponding to data stored on the other device, based on the accessed data, determine whether the data stored in the memory is to be maintained, and if the data stored in the memory is not to be maintained, cause the memory to not maintain the stored data.

BRIEF DESCRIPTION OF THE DRAWINGS

The accompanying drawings, which are incorporated in and constitute a part of this specification, illustrate implementations of inventive concepts and, together with the description, serve to explain various advantages and principles of the invention.

DETAILED DESCRIPTION OF THE INVENTION

Reference is made to implementations illustrated in the accompanying drawings. The same reference numbers are generally used throughout the drawings and the following description to refer to the same or like parts.

Figure 1:
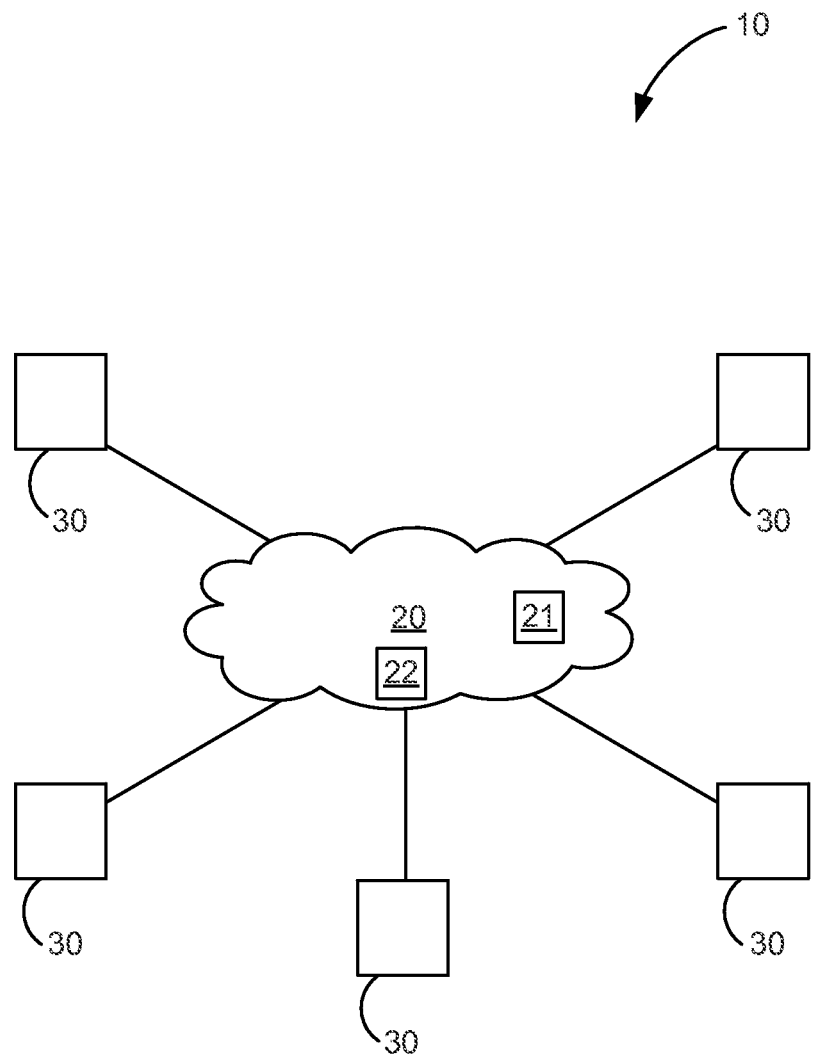
FIG. 1 is a block diagram illustrating an implementation of a cloud computing network.

FIG. 1 is a block diagram illustrating a cloud computing network 10. As shown, the network 10 includes network resources 20 and a plurality of devices 30.

The network resources 20 may include, for example, computing resources such as servers, routers, computational resources, memory, databases, software, services such as printing, and the like. In some implementations, the network resources 20 are understood to be always available for use by the devices 30. In this implementation, the network resources 20 include cloud storage controller 21, and cloud storage 22.

The devices 30 may include such devices as desktop computers, phones, laptop computers, and servers. The devices 30 may be selectively connectable to the network resources 20. For example, a user may turn on a laptop computer, connect to the cloud, access a file from a memory of the network resources 20, and then disconnect from the cloud.

A first method of allowing a user to share or access data from anywhere and anytime includes storing the data on the cloud network resources 20. A second method of allowing the user to share were access data from anywhere and anytime include storing the data locally on one of the devices 30.

When data is stored on the cloud, the data is copied to storage that is a network resource 20. Examples of such storage include services provided by Amazon S3, Dropbox, Google Drive, and Microsoft Skydrive. Using this method, once data is moved to the cloud, that data can be easily shared or accessed or modified from anywhere at any time. Some services, like dropbox, will also synchronize any modified data in the cloud back to the users device. This approach only allows sharing and access of data that is stored on the cloud. Accordingly, to allow for sharing or access, the user must upload the data to the cloud prior to sharing or access. Only after the file has been copied to the cloud, sharing of the file or access to it is possible.

This approach has a benefit that access to the data is fast because the data may be in a datacenter that is well connected to the internet. In addition, availability of the data is high such that the data is available when needed because datacenters are designed to provide high availability compared to devices such as home computers. A downside to this approach is cost. It is expensive to keep data in a network resource 20 compared to keeping it on a device 30.

If data is stored locally, the data is stored, for example, in a local memory of a device 30. For example, the data may be on a desktop computer (PC) at home. Software running on the PC allows remote access to data on this PC and allows data on the PC to be shared. The sharing may be, for example, with an HTTP URL that uniquely identifies the PC and the file (or folder or files) being shared. This approach has a benefit that there is no need to copy the data to the cloud. This method is therefore cheap since no cloud storage is involved.

This approach has a downside that the access speed to the shared file is limited by the user's internet link. So sharing to even a small number of other users is not practical for most users. This approach also has a downside that access to a file is only possible when the device storing that file is connected to the network and is accessible. If there is a power failure at a home, the files on the at home device 30 can no longer be accessed.

In some implementations, the network resources 20 include a cloud storage controller 21, which is configured to selectively store certain data on cloud storage 22. The cloud storage controller 21 allows devices 30 to use the expensive, high performance and high availability network resource memory for select data to maximize performance, and store other data locally to minimize cost.

The cloud storage controller 21 attempts to predict which data from the local memories of the devices 30 is likely to be accessed by other devices 30. The cloud storage controller 21 automatically stores a copy of the "likely to be accessed" data on a cloud storage 22. Since the cloud storage 22 has high performance and high availability online storage, access to the data stored thereon is fast and highly available. In some implementations, the data stored in cloud storage 22 includes only a portion of a file stored locally on a device 30.

The performance of the system is based at least in part on the accuracy of the prediction performed by the cloud storage controller 21. To perform this prediction, the cloud storage controller 21 may use information about habits of users of the devices 30, information about the users activity from third parties, information on what files have been shared (so they are likely to be accessed), and information about and in the files and data itself. Other data and information sources can be used to improve the accuracy of the predictions.

If requested data for a requesting device 30 is not available in the cloud storage 22, the cloud storage controller 21 can (a) retrieve the data from a device 30 storing the requested data locally if the storing device 30 is available, and provide the requested data to the requesting device 30, (b) schedule the data retrieval from the storing device 30 at a future time so that the requested data will be available when later requested, and indicate to the requesting device 30 that the requested data is not currently available, but may be available later, or (c) note that the storing device 30 is not available, and indicate to the requesting device 30 that the data is not available.

In response to requests for data, the cloud storage controller 21 can also indicate to the requesting device 30 that the requesting device 30 can request the data directly from the storing device 30 data. In some implementations, the requesting device 30 may request the data directly from the storing device 30 without contacting the cloud storage controller 21.

When the storing device 30 is accessed through the cloud storage controller 21, the requesting device 30 may receive no indication whether the data is sourced by cloud storage 22 associated with the cloud storage controller 21 or by the storing device 30.

In some implementations, to handle operations that change the state of the data stored in both the cloud storage 22 and locally on a storing device 30, the cloud storage controller 21 is configured to propagate the results of the change operations to both the cloud storage 22 and the memory local to the storing device 30 before the cloud storage controller 21 provides a response to the initiator of the operation.

In some implementations, the cloud storage controller 21 may provide a response to the initiator of the operation before the changes are propagated to the local memory of the storing device 30. In such implementations, the cloud storage controller 21 may be configured to accumulate and optimize the propagation of changes to the memory local to the storing devices 30. In such implementations, the change operations may be completed from the perspective of the initiators of the operations despite, for example, one or more of the storing devices 30 being unavailable. Once the cloud storage controller 21 has accepted an operation that changes the state of the data, the cloud storage controller 21 ensures that all normal subsequent requests for data reflect the results of the change operation regardless of whether the change has been propagated to the associated storing device 30. Once the associated storing device 30 is available, the cloud storage controller 21 may determine whether to propagate the change to the local memory of the storing device 30.

This approach to selectively using the online storage may provide system performance similar to that of storing all data on the cloud with the cost similar to that of storing all data locally. The actual performance and cost depend on the size of the cloud storage 22 and the accuracy of the predictions made by the cloud storage controller 21 regarding the data that is likely to be requested. In some implementations, the chances that a request for data cannot be satisfied by the cloud storage controller 21 without accessing data stored locally are less than 1% using even a simple prediction method. Accordingly, various prediction methods may be used.

In some implementations, the cloud storage controller 21 stores all data in category "A" (discussed below), stores low fidelity versions of data in category "B" (discussed below), and stores metadata for data in category "C" (discussed below).

Category "A" data may include data with changes that have not been propagated to the local memory of the storing device 30. Category "A" may also include data accessed, created, or modified within a specified time period, for example, within the last 30 days. Category "A" may also include data shared within a specified time period, for example, within the last 6 months.

Category "B" data may include data which is not in Category "A" and meets other criteria, such as being created or modified within a time period, for example, within the last 60 days. The low fidelity versions of Category "B" data, may include data, such as photos and videos with enough resolution to be usable on a mobile device (e.g. 640 pixels longest edge for photos and 320 pixels longest edge for video). In some implementations, the 1st few pages of documents are generated as low fidelity versions of the data.

Category "C" data may include all data locally stored. The metadata may include information such as filenames, file sizes, and dates associated with the data. Because the metadata is stored, users of devices 30 can browse the contents of all the other devices 30 while accessing only data stored on the cloud.

In some implementations, different criteria may be additionally or alternatively used. For example, data accessed but not modified may be kept in the cloud storage 22 for a first time period, for example, a week, while modified files may be kept for a longer duration, for example, a month. The cloud storage controller 21 may be configured to use any of the following aspects of the data to determine whether the data is stored in the cloud storage 22:

(1) Last access time
(2) Last modification time
(3) Creation time
(4) Size of file
(5) Whether the data updated on the storing device 30
(6) Sizes of low fidelity versions at different resolutions of interest
(7) When the data was last shared
(8) Number of devices or users shared with
(9) Access pattern of the devices or users a file is shared with
(10) Whether the data is related to terms recently used on the internet
(11) Whether the data is related to birthdays, anniversaries or events in the life of users who have access to the data or who are related to such users
(12) Whether the data is related to holidays, festivals, memorial days or other special days close to the current date.
(13) Whether the data is related to activity of a user's or a user's relative's email or blog or company.
(14) Any specific hints or requests from a user who may have or can get access to the data.

The method for determining what data to store in cloud storage 22 can be tuned or customized in real time, for example, based on information as determined by the cloud storage controller 21. The methods for determining can be specific to a device, a group of devices, a user, or a group of users. In some implementations, the cloud storage controller 21 is configured to determine patterns and to automatically tune the prediction and storage method based on access patterns. For example, the cloud storage controller 21 may determine that data that has been accessed once is rarely accessed again if not accessed within two weeks, and therefore, modifies the method for determining what data to store in the cloud storage 22 such that data that has been accessed once is discarded after two weeks of no activity.

Figure 2:
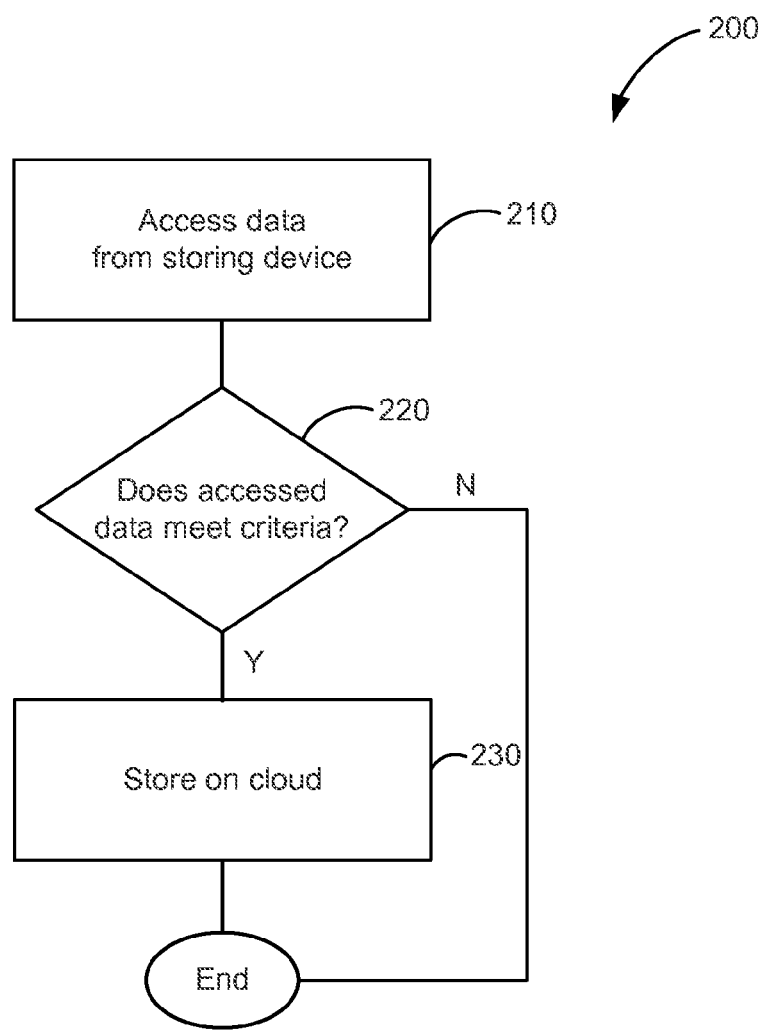
FIG. 2 is a flowchart diagram illustrating an implementation of a method of storing data to a cloud computing network.

FIG. 2 is a flowchart diagram illustrating an implementation of a method of storing data to a cloud computing network. In some implementations, the method 200 is performed by a cloud storage controller such as cloud storage controller 21 discussed above with reference to FIG. 1.

In step 210, data stored locally on a device, such as one of the devices 30 of FIG. 1, is accessed. For example a first device 30 may access data stored locally on a second device 30 via the cloud storage controller 21.

In step 220, the cloud storage controller determines whether the accessed data should be stored in a cloud storage such as cloud storage 22. The determination may be made, for example, using one or more aspects of the criteria discussed above.

In step 230, if the cloud storage controller determines that the accessed data is to be stored, the cloud storage controller stores the accessed data in the cloud storage.

Figure 3:
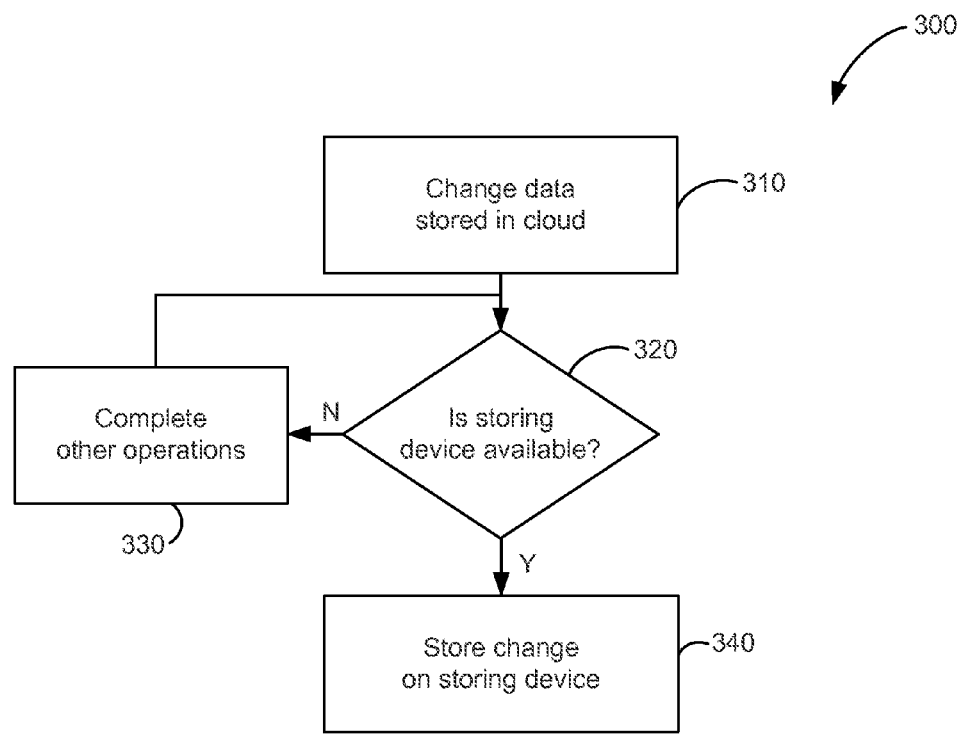
FIG. 3 is a flowchart diagram illustrating an implementation of a method of updating device data which has been changed on the cloud computing network.

FIG. 3 is a flowchart diagram illustrating an implementation of a method of updating device data which has been changed on the cloud computing network, where the changed data corresponds with data stored locally on a storing device. In some implementations, the method 300 is performed by a cloud storage controller such as cloud storage controller 21 discussed above with reference to FIG. 1.

In step 310, data stored in a cloud storage device, such as cloud storage 22 of FIG. 1, is changed. The change in the data may occur in response to an operation initiated by a device, such as one of the devices 30 of FIG. 1. For example, a user of a first device may access and edit a file stored on the cloud. In response to the saved edits, the data stored on the cloud representing the file is changed.

In step 320, the cloud storage controller determines whether the storing device is available. The storing device may be unavailable, for example, because the storing device is off or is not connected to a network.

If the storing device is determined in step 320 to be unavailable, in step 330, other operations are performed. The other operations may be unrelated to the changed data. However, some of the other operations may access the changed data, or further manipulate the changed data. The other operations accessing or manipulating the changed data operate on the changed data as if the changed data had been stored in the storing device.

If the storing device is determined in step 320 to be available, in step 340, the change data is written to the local memory of the storing device. Accordingly, the data of the storing device associated with data changed in the cloud is appropriately updated.

Figure 4:
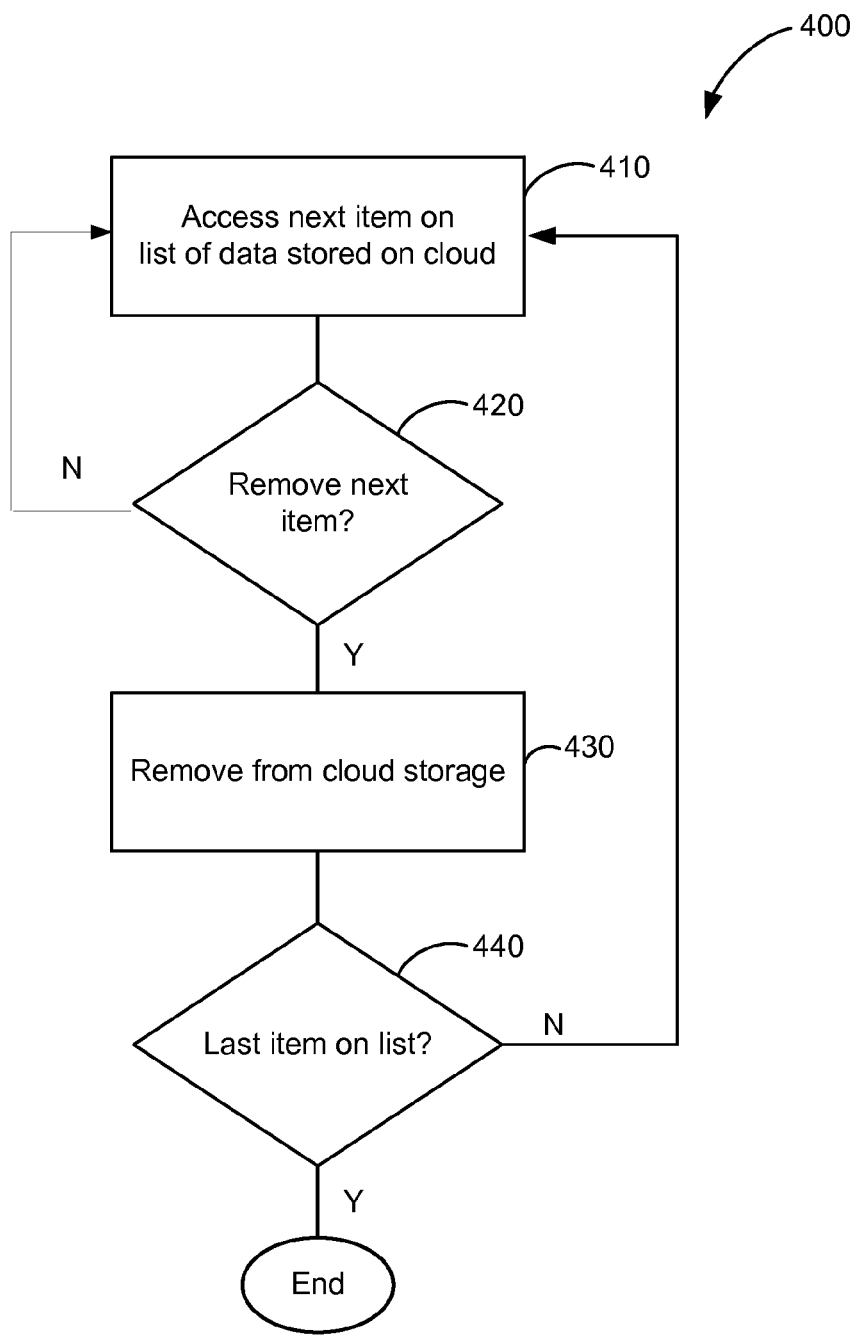
FIG. 4 is a flowchart diagram illustrating an implementation of a method of removing data stored on a cloud computing network.

FIG. 4 is a flowchart diagram illustrating an implementation of a method of removing data stored on a cloud computing network. In some implementations, the method 400 is performed by a cloud storage controller such as cloud storage controller 21 discussed above with reference to FIG. 1.

In step 410, data related to data stored in a cloud storage, such as cloud storage 22 of FIG. 1, is accessed. For example, the cloud storage controller may access metadata related to the data stored in the cloud storage.

In step 420, the cloud storage controller determines whether the data associated with the accessed data should be removed from the cloud storage. The determination may be made, for example, using criteria discussed above as applied to the accessed data. If the cloud storage controller determines that the data associated with the access data should not be removed from the cloud storage, the method returns to step 410.

In step 430, if the cloud storage controller determines that the data associated with the accessed data is to be removed, the cloud storage controller removes the data associated with the accessed data from the cloud storage. For example, the cloud storage controller may remove indications that memory locations occupied by the data associated with the accessed data are occupied.

In step 440, the cloud storage controller determines whether additional data stored on the cloud storage should be analyzed for potential removal. If additional data is to be analyzed, the method returns to step 410.

Figure 5:
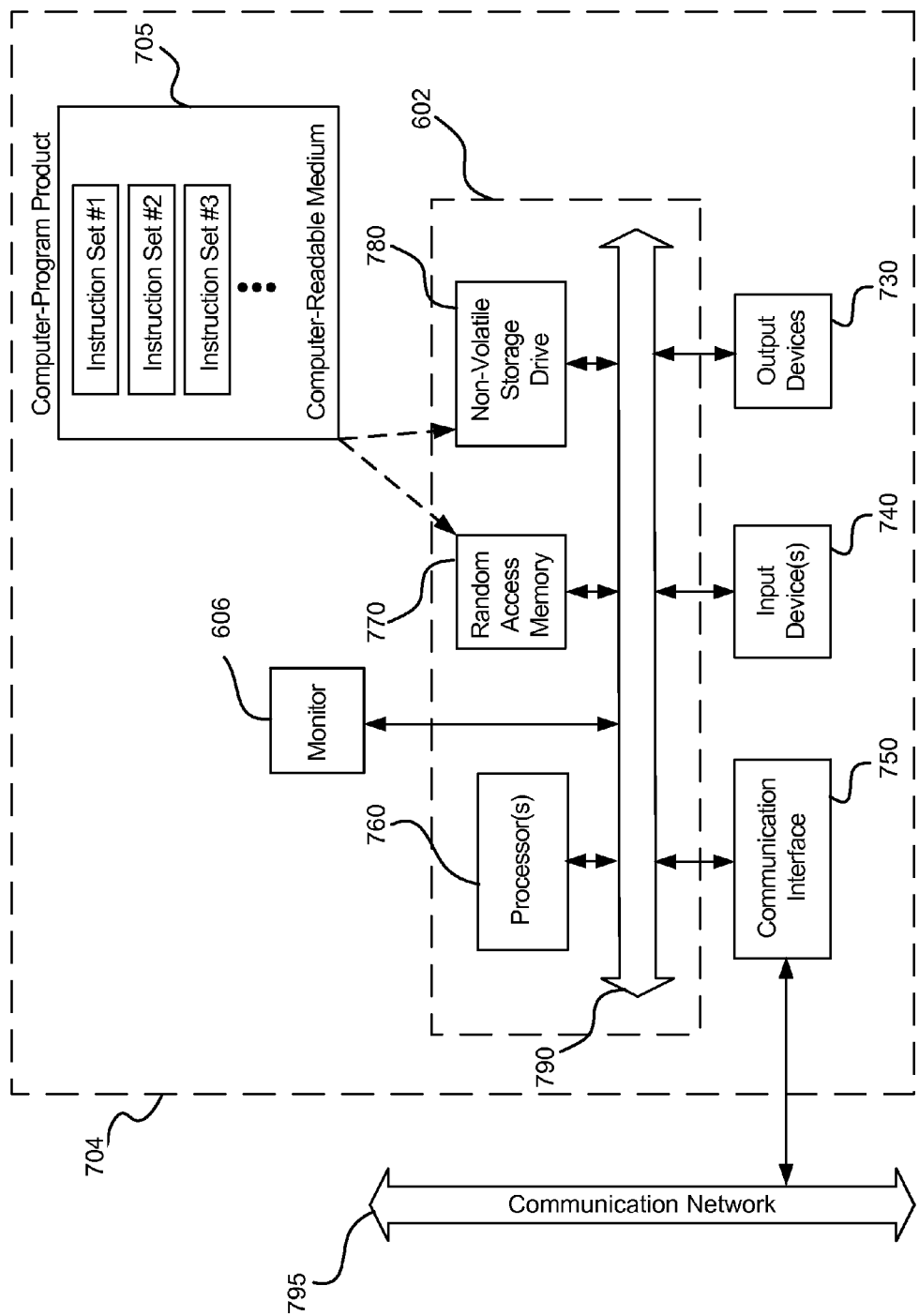
FIG. 5 is a block diagram illustrating an implementation of a device connected to a cloud computing network.

FIG. 5 is a block diagram illustrating an implementation of a computing device 704, such as the devices 30 or the cloud storage controller 21. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof.

Device 704 comprises a computer 602, a monitor 606 coupled to computer 602, one or more additional user output devices 730 (optional) coupled to computer 602, one or more user input devices 740 (e.g., keyboard, mouse, track ball, touch screen) coupled to computer 602, an optional communications interface 750 coupled to computer 602, a computer-program product 705 stored in a tangible computer-readable memory in computer 602. Computer-program product 705 directs device 704 to perform the above-described methods. Computer 602 may include one or more processors 760 that communicate with a number of peripheral devices via a bus subsystem 790. These peripheral devices may include user output device(s) 730, user input device(s) 740, communications interface 750, and a storage subsystem, such as random access memory (RAM) 770 and non-volatile storage drive 780 (e.g., disk drive, optical drive, solid state drive), which are forms of tangible computer-readable memory.

Computer-program product 705 may be stored in non-volatile storage drive 780 or another computer-readable medium accessible to computer 602 and loaded into memory 770. Each processor 760 may comprise a microprocessor, such as a microprocessor from Intel® or Advanced Micro Devices, Inc.®, or the like. To support computer-program product 705, the computer 602 runs an operating system that handles the communications of product 705 with the above-noted components, as well as the communications between the above-noted components in support of the computer-program product 705. Exemplary operating systems include Windows® or the like from Microsoft® Corporation, Solaris® from Oracle®, LINUX, UNIX, and the like.

User input devices 740 include all possible types of devices and mechanisms to input information to computer system 602. These may include a keyboard, a keypad, a mouse, a scanner, a digital drawing pad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, a drawing tablet, a voice command system. User input devices 740 typically allow a user to select objects, icons, text and the like that appear on the monitor 606 via a command such as a click of a button or the like. User output devices 730 include all possible types of devices and mechanisms to output information from computer 602. These may include a display (e.g., monitor 606), printers, non-visual displays such as audio output devices, etc.

Communications interface 750 provides an interface to other communication networks 795 and devices and may serve as an interface to receive data from and transmit data to other systems, WANs and/or the Internet. Embodiments of communications interface 750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 750 may be coupled to a computer network, to a FireWire® bus, or the like. In other embodiments, communications interface 750 may be physically integrated on the motherboard of computer 602, and/or may be a software program, or the like.

RAM 770 and non-volatile storage drive 780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 770 and non-volatile storage drive 780 may be configured to store the basic programming and data constructs that provide the functionality of various embodiments of the present invention, as described above.

Software instruction sets that provide the functionality of the present invention may be stored in RAM 770 and non-volatile storage drive 780. These instruction sets or code may be executed by the processor(s) 760. RAM 770 and non-volatile storage drive 780 may also provide a repository to store data and data structures used in accordance with the present invention. RAM 770 and non-volatile storage drive 780 may include a number of memories including a main random access memory (RAM) to store of instructions and data during program execution and a read-only memory (ROM) in which fixed instructions are stored. RAM 770 and non-volatile storage drive 780 may include a file storage subsystem providing persistent (non-volatile) storage of program and/or data files. RAM 770 and non-volatile storage drive 780 may also include removable storage systems, such as removable flash memory.

Bus subsystem 790 provides a mechanism to allow the various components and subsystems of computer 602 communicate with each other as intended. Although bus subsystem 790 is shown schematically as a single bus, alternative embodiments of the bus subsystem may utilize multiple busses or communication paths within the computer 602.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While various embodiments of present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A cloud storage controller configured for use within a cloud computing network, the cloud computing network comprising:
   the cloud storage controller,
   a cloud storage device configured to store data, and
   a plurality of network devices in communication with the cloud storage controller,
   wherein the cloud storage controller comprises:
      an input port configured to receive input data from the network devices;
      an output port configured to transmit output data to the network devices; and
      a processor configured to:
         determine whether first input data from a first network device is to be stored in the cloud storage device, wherein the first input data is accessible to each of a plurality of network devices other than the first network device, wherein the determination is made based on a prediction regarding likelihood of use of the first input data by the other network devices,
         cause data based on the first input data from a first network device to be stored in the cloud storage device, wherein the stored data is accessible to the other network devices, and wherein the data based on the first input data is stored in the cloud storage device as a result of the prediction,
         respond to a request from a second network device to access the first input data by accessing the data stored in the cloud storage device,
         generate first output data based on the data stored in the cloud storage device, and
         cause the first output data to be transmitted to the second network device via the output port.

2. The controller of claim 1, wherein the prediction is made based on one or more of:
   information about habits of users network devices other than the first network device;
   information on whether the input data has been shared; and
   information in the first input data.

3. The controller of claim 1, wherein the processor is further configured to:
   respond to a second request from the second network device to access other data by determining whether the other data is stored in the cloud storage device;
   if the other data is stored in the cloud storage device, generate output data based on the other data stored in the cloud storage device, wherein the output data is indicative of the other data; and
   if the other data is not stored in the cloud storage device, generate output data based on the other data stored in the first network device, wherein the output data is indicative of the other data, and wherein the first network device is part of a local network and not part of the cloud computing network.

4. The controller of claim 3, wherein the processor is further configured to:
   if the other data is not stored in the cloud storage device, request the other data from the first network device, receive the other data from the first network device, and transmit the other data to the second network device.

5. The controller of claim 1, wherein the processor is further configured to respond to a second request from the second device to access other data by indicating to the second device that the other data is available directly from the first device.

6. The controller of claim 1, wherein the processor is further configured to respond to a second request from the second device to change particular data stored in the cloud storage device by:
   generating instructions causing the particular data in the cloud storage device to be changed, and
   generating instructions causing data on another network device corresponding to the particular data in the cloud storage device to be changed.

7. The controller of claim 6, wherein the instructions causing the particular data in the cloud storage device to be changed are executed substantially immediately, and the instructions causing the data on the other network device to be changed are executed after the other device becomes available following a time of the other device being unavailable.

8. The controller of claim 1, wherein the stored data comprises a low fidelity version of the input data.

9. The controller of claim 1, wherein the stored data comprises metadata of the input data.

10. The controller of claim 1, wherein the processor is further configured to categorize the first input data to be stored in the cloud storage device and store the first input data in the cloud storage based on the categorization.

11. A method of using a cloud storage controller configured for use within a cloud computing network, the cloud computing network comprising:
- the cloud storage controller,
- a cloud storage device configured to store data, and
- a plurality of network devices in communication with the cloud storage controller, wherein the cloud storage controller comprises:
- an input port configured to receive input data from the network devices;
- an output port configured to transmit output data to the network devices; and
- a processor, wherein the method includes:
- with the processor, determining whether first input data from a first network device is to be stored in the cloud storage device, wherein the first input data is accessible to each of a plurality of network devices other than the first network device, wherein the determination is made based on a prediction regarding likelihood of use of the first input data by the other network devices,
- with the processor, causing data based on the first input data from a first network device to be stored in the cloud storage device, wherein the stored data is accessible to the other network devices, and wherein the data based on the first input data is stored in the cloud storage device as a result of the prediction,
- with the processor, responding to a request from a second network device to access the first input data by accessing the data stored in the cloud storage device,
- with the processor, generating first output data based on the data stored in the cloud storage device, and
- with the processor, causing the first output data to be transmitted to the second network device via the output port.

12. The method of claim 11, wherein the prediction is made based on one or more of:
- information about habits of users network devices other than the first network device;
- information on whether the input data has been shared; and
- information in the first input data.

13. The method of claim 11, further comprising, with the processor:
- responding to a second request from the second network device to access other data by determining whether the other data is stored in the cloud storage device;
- if the other data is stored in the cloud storage device, generating output data based on the other data stored in the cloud storage device, wherein the output data is indicative of the other data; and
- if the other data is not stored in the cloud storage device, generating output data based on the other data stored in the first network device, wherein the output data is indicative of the other data, and wherein the first network device is part of a local network and not part of the cloud computing network.

14. The method of claim 13, further comprising, with the processor:
- if the other data is not stored in the cloud storage device, requesting the other data from the first network device, receiving the other data from the first network device, and transmitting the other data to the second network device.

15. The method of claim 11, further comprising, with the processor, responding to a second request from the second device to access other data by indicating to the second device that the other data is available directly from the first device.

16. The method of claim 11, further comprising, with the processor, responding to a second request from the second device to change particular data stored in the cloud storage device by:
- generating instructions causing the particular data in the cloud storage device to be changed, and
- generating instructions causing data on another network device corresponding to the particular data in the cloud storage device to be changed.

17. The method of claim 16, wherein the instructions causing the particular data in the cloud storage device to be changed are executed substantially immediately, and the instructions causing the data on the other network device to be changed are executed after the other device becomes available following a time of the other device being unavailable.

18. The method of claim 11, wherein the stored data comprises a low fidelity version of the input data.

19. The method of claim 11, wherein the stored data comprises metadata of the input data.

20. The method of claim 11, further comprising, with the processor, categorizing the first input data to be stored in the cloud storage device and store the first input data in the cloud storage based on the categorization.

* * * * *